United States Patent [19]

Wagner

[11] Patent Number: 4,653,673
[45] Date of Patent: Mar. 31, 1987

[54] PUMP FOR PRECISELY DISPENSING LIQUIDS

[75] Inventor: David L. Wagner, Kent, Wash.

[73] Assignee: The Boeing Company, Seattle, Wash.

[21] Appl. No.: 833,097

[22] Filed: Feb. 25, 1986

[51] Int. Cl.[4] .............................................. G01F 11/06
[52] U.S. Cl. .................... 222/309; 222/389;
  222/391; 222/327; 74/141.5; 74/334
[58] Field of Search .............. 222/334, 391, 389, 278,
  222/288, 327, 328, 319, 309; 74/141.5, 128;
  604/224; 184/37, 39

[56] References Cited

U.S. PATENT DOCUMENTS

| | | | |
|---|---|---|---|
| 2,216,121 | 10/1940 | Legro et al. | 1/32 |
| 2,216,126 | 10/1940 | Matheson | 1/32 |
| 2,726,802 | 12/1955 | Jones | 226/125 |
| 2,731,176 | 1/1956 | Crewe | 222/326 |
| 2,732,102 | 1/1956 | Ekins | 222/327 |
| 2,735,431 | 2/1956 | Swanson | 604/224 |
| 2,884,098 | 4/1959 | Hutchison | 189/36 |
| 2,884,099 | 4/1959 | Nenzell | 189/36 |
| 3,167,219 | 1/1965 | Hoveland | 222/391 |
| 3,350,774 | 11/1967 | Bridges, Sr. | 29/564 |
| 3,381,861 | 5/1968 | Stein | 222/256 |
| 3,401,847 | 9/1968 | Downing | 222/391 |
| 3,478,409 | 11/1969 | Votaw et al. | 29/458 |
| 3,799,406 | 3/1974 | St. John et al. | 222/391 |
| 3,904,718 | 9/1975 | Kuehn, Jr. | 264/39 |
| 4,009,804 | 3/1977 | Costa et al. | 222/391 |
| 4,081,112 | 3/1978 | Chang | 222/391 |
| 4,144,625 | 3/1979 | Hogenhout | 29/34 B |
| 4,305,540 | 12/1981 | Olson | 227/61 |
| 4,404,054 | 9/1983 | Dickson et al. | 156/92 |
| 4,589,870 | 3/1986 | Citrin et al. | 222/391 |

Primary Examiner—H. Grant Skaggs
Attorney, Agent, or Firm—Eugene O. Heberer

[57] ABSTRACT

A positive displacement pump (10) for precisely dispensing liquids through a dispensing tube (126) in which there is a pump body (12) having a shaft (18) fitted for reciprocating therein. Incremental adjusting nuts (24, 26) on an outer end (22) of the shaft limit the movement thereof in a pumping direction. There is a first friction clamp (46) pivotally mounted adjacent one of its ends on the other end (48) of the shaft and a second friction clamp (82) is pivotally mounted adjacent one of its ends on a member (80) fixed to the body (12) adjacent the other end (48) of the shaft (18). The other ends of the clamps (46, 82) have cylindrical openings (66, 92) in substantial alignment to receive a hardened, smoothly finished pump rod (102). The pump rod is precisely aligned in bushings (98, 100) secured to the pump body. There are springs (70) and (90) biasing the clamps between the pivotal mountings and the cylindrical openings against the direction of pumping. The shaft (18) when moved in the pumping direction moves the first clamp against its bias in the direction of pumping and maintaining its grip on the rod (102) and carries it in the direction of pumping to the extent permitted. At the same time the clamp (82) releases its grip on the rod to permit it to slide in the pumping direction. When the shaft (18) is reversed in direction, friction clamp (46) releases its grip and at the same time the friction clamp (82) maintains its grip on the rod (102) holding it from moving against the pumping direction. This arrangement effects a precise pumping motion so as to precisely dispense a required and predetermined quantity of liquid.

10 Claims, 8 Drawing Figures

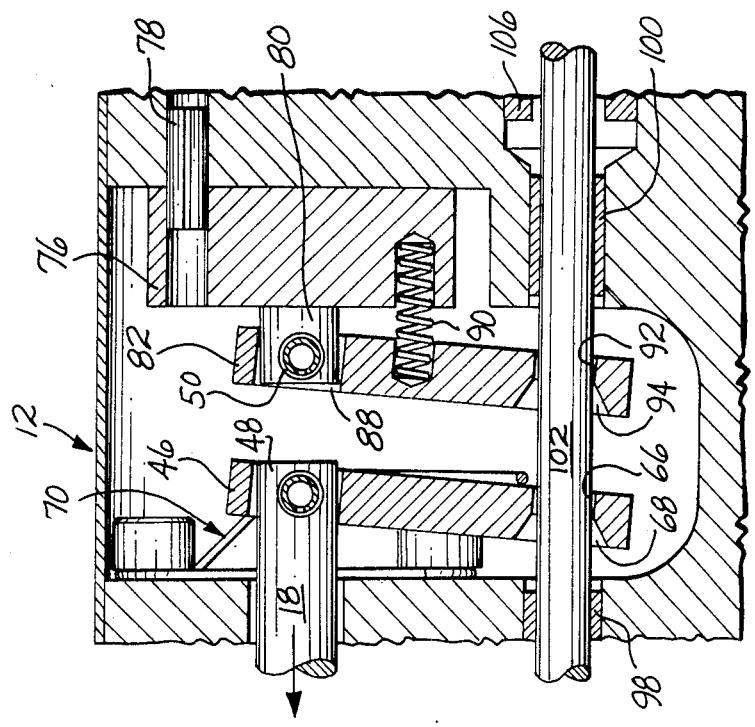
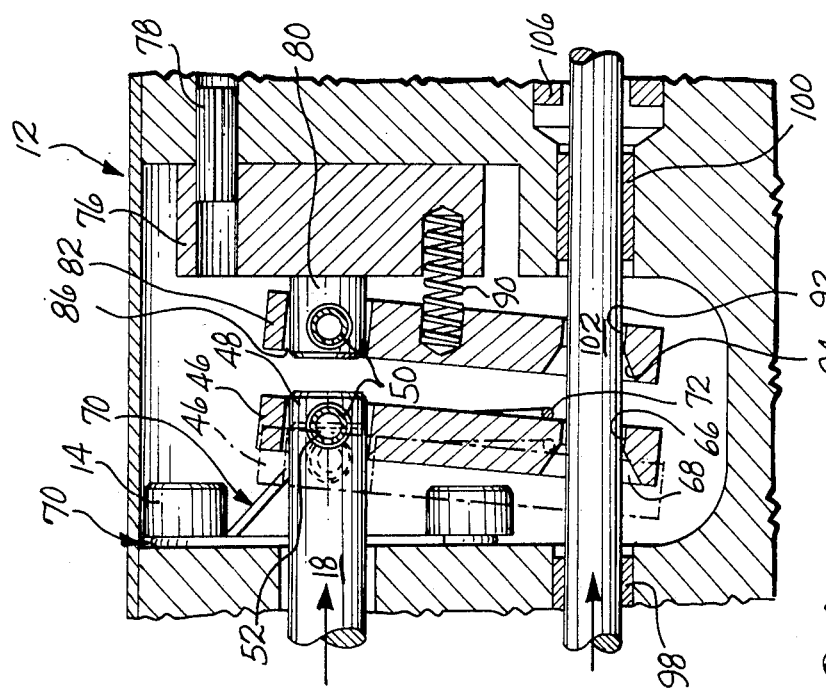

PUMP FOR PRECISELY DISPENSING LIQUIDS

TECHNICAL FIELD

The invention relates to a positive displacement pump for precisely dispensing liquids, and including friction clamps for moving a pump piston rod only in the pumping direction.

BACKGROUND ART

Large C-frame, Gemcor Riveters, for example, are used to drill holes and install fasteners in aircraft. Some fasteners require a sealant between a countersink surface of a fastener, as a rivet, and a countersunk surface of an aircraft skin in which the rivet head fits. The sealant is required for corrosion protection. The sealant is typically dispensed from a Semco glue gun. This type of glue gun has a relatively large cartridge with a piston to push the sealant. It also has a valve to introduce high pressure air behind the piston in order to urge the sealant out the dispensing end of the glue gun. The present guns do not have means for precise volume control of the sealant dispensed. Therefore, the sealant frequently is dispensed in either too large a quantity or too small a quantity.

The variations in quantity are sometimes related to a change in viscosity that takes place as the sealant begins to set during dispensing. Both of the extremes in quantity create lost time and extra cost. If too much sealant is dispensed, then the airplane parts are contaminated and must subsequently be cleaned. If too small a quantity is dispensed, then rework is required. Thus, there has been a need for a sealant dispensing system to provide precise quantity control of the sealant dispensed and which is independent of any changes in viscosity.

There are four known types of dispensing systems of which applicant is aware. The first one is that indicated above. It consists of a relatively large cartridge and piston and as indicated the system is not precise. Its dispensed quantity varies with the viscosity, and most of the sealant is wasted in that it sets in the cartridge before it can be dispensed.

A second system employs a peristaltic-type pump and it is good for continuous flow-type operations with large volumes, but does not work for small quantities. The peristaltic-type pump consists of a plastic tube which is contained within a semicircle cylindrical enclosure and then squeezed by rollers. This introduces a pinching action which forces liquid to travel within the plastic tube. The problem with this system is that no means are presently available to drive the rollers for precise increments, and even if there was, the volume dispensed would vary when the rollers engage and disengage the tube.

Two other commercially available systems are used for dispensing small quantities of sealants or adhesives. The first one is a sophisticated control box applied to another cartridge piston arrangement only with smaller cartridges. This system has the same problems as the cartridge piston system described above. The other system includes a precision screw motor used to push a screw which in turn pushes a piston inside a cartridge. The problems with this system are primarily with the awkwardness of the controls, clean-up, large size, and cost.

A search of the patent literature discloses positive displacement pumps having a rod which is driven by friction clamp means. For example, in U.S. Pat. No. 2,726,802 to Jones, for a Loading Rig for Caulking Guns there is a piston rod 26 which passes through a hole in a plate 33 and mounted on the plate is an upper coil spring 34 which is surmounted by double washer assembly 35. Both spring 34 and washer assembly 35 surround the rod 26, the spring biasing the washer into contact with a pintle 36. In consequence of the non-central location of the pintle 36 and the action of coil spring 34, washer assembly 35 assumes the inclined position shown in FIG. 1 in which the edges of the washer assembly surrounding the hole therein bite into operating rod 26, thereby effectively precluding upward movement but nevertheless permitting limited downward movement of the rod. Immediately below the plate 33 is a similarly shaped double washer assembly 37 that is biased toward a horizontal position by an underlying coil spring 38 surrounding operating rod 26. Like washer assembly 35, washer assembly 37 is provided with a central hole through which operating rod 26 passes. Such hole is only slightly larger than the diameter of the operation rod 26. Thus if washer assembly 37 is depressed in one end it will bite into operating rod 26 much as does washer assembly 35.

U.S. Pat. No. 3,381,861, to Stein for a Gun for Applying Adhesives to Surfaces, shows a slidable plunger tube 20 passing through a gun housing 19 in which a plunger release member 35 has inner and outer ends 36 and 37. The inner end engages a notch 38 in the housing wall. The member 35 is apertured to fit around the tube 20 to clamp the tube while the member 35 is in an unreleased position. The outer end 37 extends beyond the housing for manual release of the member 35. A plunger rod feed washer 39 is mounted on the tube 20 and retained between coils of plunger feed spring 40. The washer 39 serves as a holding clamp on the plunger tube 20. The upper end of the spring 40 bears against the plunger release member 35 and the lower end bears on the bottom of the housing 19. When a lever 41 is manipulated by gripping the lever and a rigid grip 44 and squeezing the lever toward the grip to cause lever end 42 to bear down on washer 39 and spring 40, the plunger tube 20 is moved to cause an adhesive to be pressed down into a pump. To stop the flow of the material through the pump, the operater depresses the plunger release member 35 by bearing down on the end 37. This releases the hold of the member 35 on the plunger tube 20 and due to the expansible urging of a spring 26 the tube 20 is raised, thereby relieving pressure on the adhesive and stopping its flow.

The following patents disclose systems of interest:

| U.S. Pat. No. | Inventor |
| --- | --- |
| 2,216,121 | R. P. Legro et al. |
| 2,216,126 | A. Matheson |
| 2,713,176 | S. Crewe |
| 2,732,102 | W. J. S. Ekins |
| 2,884,098 | J. P. Hutchison |
| 2,884,099 | J. F. Nenzell |
| 3,167,219 | J. C. Hoveland |
| 3,350,774 | T. N. Bridges, Sr. |
| 3,478,409 | R. L. Votaw et al. |
| 3,904,718 | Kuehn, Jr. |
| 4,009,804 | Costa et al. |
| 4,081,112 | Chang |
| 4,144,625 | Hogenhout |
| 4,305,540 | Olson |
| 4,404,054 | Dickson et al. |

DISCLOSURE OF THE INVENTION

The invention is a positive displacement pump for dispensing precise quantities of liquids. The pump will operate with viscous liquids or with liquids which are retained in a dispensing tube by capillary attraction. The quantities may be large or small, but the embodiment disclosed is for the purpose of pumping precise small quantities. The pump is made so that all of the wetted surfaces may be discarded and any contaminated surfaces may be easily cleaned.

The invention has a pump body having a cylindrical shaft fitted for reciprocating therein and there is an air cylinder and piston in or connectable to the body for reciprocating the shaft in a pumping direction and reverse. There are means on one end of the shaft to limit movement thereof in a pumping direction and there is a first friction clamp pivotally mounted adjacent to one of its ends on the other end of the shaft. A second friction clamp is pivotally mounted adjacent one of its ends on a cylindrical member fixed to the pump body adjacent the other end of the shaft.

The other ends of the clamps depend from the pivotal mountings and have cylindrical openings therethrough in substantial alignment to receive a hardened, smoothly finished cylindrical pump piston rod. The pump rod is precisely aligned in bushings secured to the pump body. There are a pair of springs secured to the body. Each of the springs is fitted to bias a respective friction clamp against the direction of pumping. This biasing effects a frictional gripping of the rod by the clamps.

The shaft when moved in the pumping direction is connected to move the first clamp, against its bias, and in the direction of pumping and the first clamp when so moved maintains its frictional grip on the rod to move it in the direction of pumping to the extent permitted by the means to limit movement of the shaft in the direction of pumping. When the rod is carried in the pumping direction by the first friction clamp, the second friction clamp releases its grip on the rod while the rod is in motion and allows it to move in the pumping direction.

When the shaft is reciprocated against the pumping direction, the first friction clamp releases its grip and at the same time the second friction clamp maintains its grip on the rod holding it from moving away from the pumping direction. Thus, the piston rod is moved only in the pumping direction. The operation is repeated when the shaft is again reciprocated in the pumping direction by the piston in the air cylinder.

The pumping end of the rod extends into a tube containing the liquid and there is a piston therein which the rod abuts. At the discharge end there is a small tube for dispensing a small amount of sealant, for example, into a countersunk area around a hole in which a countersink head rivet fits.

When the operations are complete the tube containing the liquid and other parts securing it to the pump body may be removed and discarded. The rod is removed in the direction of pumping and wiped off to remove any contaminants. Another tube containing a supply of liquid is again attached to the pump body and the rod is inserted from the other end, in the pumping direction, through the bushings and the cylindrical openings in the friction clamps.

Each of the friction clamps is pivotally engaged on a pin which is fixed, the pin supporting the first clamp being fixed to the shaft and the pin supporting the second clamp being fixed to the member fixed to the body adjacent the other end of the shaft. There are clearances between the pin and the shaft at the first clamp and clearances between the pin and the member at the second clamp. There also are clearances between the first clamp and the shaft and similar clearances between the supporting member and the second clamp.

These two types of clearances permit the friction clamps to translate into directions essentially perpendicular to the piston rod and the translation is limited by the amount of clearance so that the friction clamps are retained in a near vicinity ready to receive the rod but are still large enough to permit easy insertion of the rod. The clearances between the clamps and the shaft or supporting member allow for pivoting motion of the clamps toward and away from the pumping direction and the clearances between the pin and the shaft or the supporting member permit upward and downward movement with respect to the rod. Conical surfaces around the cylindrical openings in the friction clamps guide the friction clamps into alignment when the rod is inserted therethrough.

The invention has the following advantages:

(1). The pump dispenses a precise amount of liquid and the amount remains precise even when the viscosity is changing during the operation.

(2). The pump is easily adjustable for quantity selection and the adjustment is infinite.

(3). All wetted surfaces are disposable and no valves are required to measure the dispensed fluid.

(4). The embodiment is simple and inexpensive to manufacture.

(5). The two friction clamps are arranged to minimize backlash or free motion.

(6). Although the clamps and rod are self-aligning for insertion of the rod, the first clamp moves the rod in the pumping direction to effect a precise motion and a precise quantity discharge.

(7). The invention may be used for any size operation, the volume accommodation is provided by varying the diameter and length of cylindrical cartridge tube.

(8). The invention minimizes waste of pre-mixed and liquids which set.

(9). The controls are simple and easy to incorporate into an existing machine.

(10). In the case of small quantity dispensing, the liquid may be triggered at any time during the cycle because the small quantity of fluid adheres to the dispensing tube until transferred.

(11). No electric or electronic controls are necessary and the invention is safe for work in hazardous environments.

(12). The cartridge dispensing tube may be flexible to permit a use in envelopes with restricted clearances and the dispensing tubes are readily adaptable to a variety of custom dispensing heads.

(13). No flushing of the system is required in that the wetted surfaces are disposable.

(14). The system is primed manually for immediate, accurate dispensing.

(15). The radial location of the rod is precise. The radial alignment of the friction clamps on the rod is accomplished by permitting the friction clamps to float in radial directions relative to the rod, but the friction clamps are not permited to float in the axial direction along the rod because of the biasing springs.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes only:

FIG. 1A is a fragmentary view illustrating a dispensing tube for small quantitites;

FIG. 6 is a fragmentary view illustrating the movement of a driving shaft and the action of the clamps to move a piston rod in a pumping direction; and FIG. 7 is a fragmentary view illustrating the movement of the shaft away from the pumping direction and the action of a clamp on the piston rod so as to restrain it from moving in a direction opposite the pumping direction.

BEST MODE FOR CARRYING OUT THE INVENTION

Figure 1:
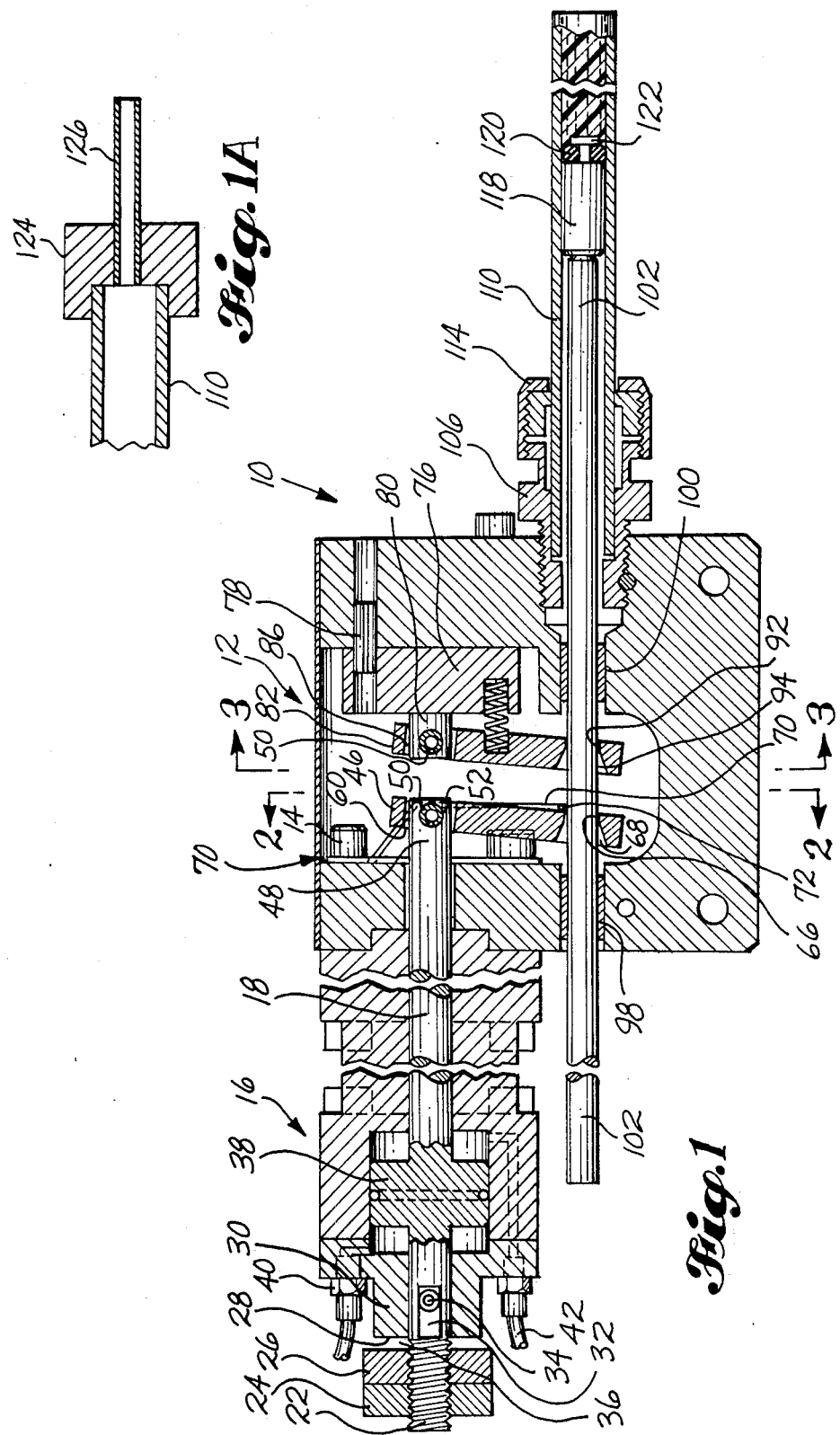
FIG. 1 is a side elevational cross-sectional view of a pump according to the invention.

Referring again to the drawings, in FIGS. 1 and 1A there is shown a pump 10, having a main frame or body 12. Attached to the body 12, by means of cap screws 14, is an air cylinder 16 for driving a cylindrical shaft 18. An outer end 22 of the shaft has incremental adjusting nuts 24 and 26 threadedly engaged therewith. The nuts 24 and 26 are positioned on the shaft to limit the movement thereof in the pumping direction, to the right in FIG. 1, the shaft 18 being movable to the right, the distance 36, until the nut 26 abuts end surface 28 on a spacing aligner 30.

The shaft 18, inwardly of the outer end, has a slot 32 therein and in the slot is a pin 34 fixed in the spacing aligner 30. This slot and pin prevent the rotation of the shaft 18. The pin 34 is slidably engaged in the slot 32 and the pin limits the reverse movement, to the left, of the shaft 18 to its adjusted position for pumping. Thus, the shaft 18 is in position to be moved in the right in the pumping direction and is held against movement to the left, against the pumping direction by the present position of the pin in the slot 32.

The shaft 18 is moved automatically by an air driven piston 38 in the air cylinder. The air to drive the shaft in the pumping direction enters through the tube 40 and the air to return the shaft enters through the tube 42. The means for regulating the flow of air are conventional and are not shown.

As shown in FIGS. 1, 2, and 4-7, a first friction clamp 46 is pivotally mounted adjacent inner end 48 of the shaft 18. The clamp 46 is pivotally engaged with a roll pin 50 which has its outer ends 52 and 54 press fit and fixed in a bore in the clamp 46, FIGS. 2 and 5. The roll pin 50 extends through a cylindrical opening 56 in the shaft. There is a clearance 58 between the roll pin 50 and the shaft end 48 to permit vertical movement of the clamp 46 with respect to the shaft end 48. The clearance 58 is shown to be annular but could be made in vertical slot form. There is also an annular clearance 60 between the shaft and the clamp. The clearance 60 permits the clamp 46 to pivot with respect to the shaft.

At the lower end of the clamp 46 there is a cylindrical bore 66 in the direction of pumping and outwardly thereof in the direction away from pumping is a conical counterbore 68.

A wire spring 70 is secured to the body 12 by cap screws 14 at upper and lower ends and has a transverse end 72 extending across the right side of the face of the clamp 46 to bias the clamp away from the pumping direction.

Figures 2, 3:
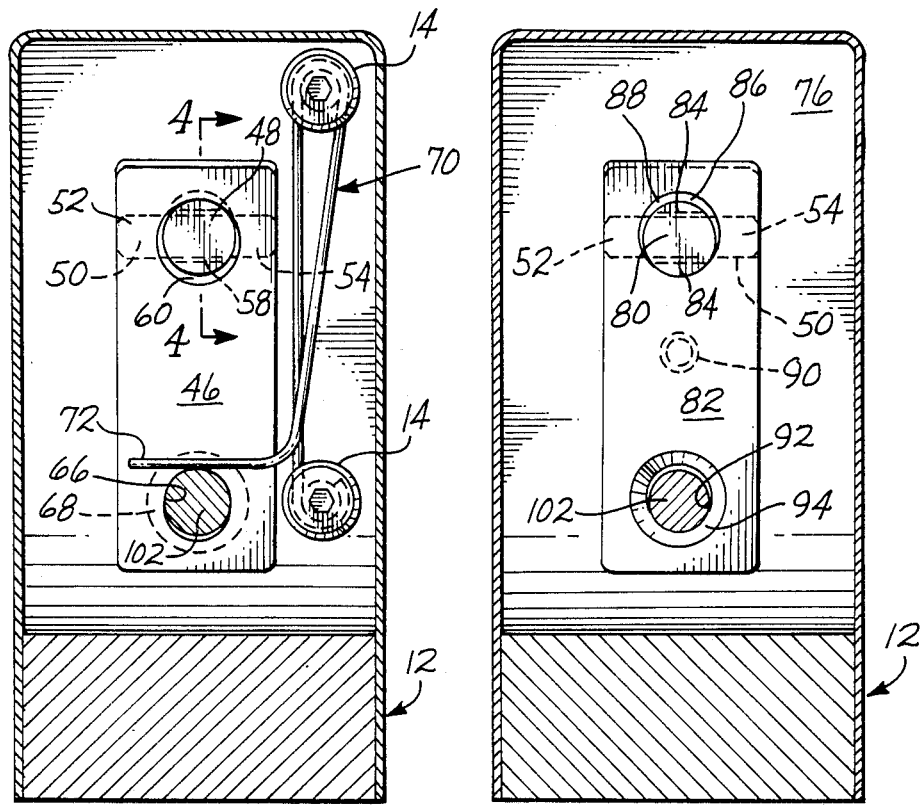
FIG. 2 is a partially cross-sectional view, taken along the lines 2—2 in FIG. 1.
FIG. 3 is a partially cross-sectional view, taken along the lines 3—3 in FIG. 1.
Figure 5:
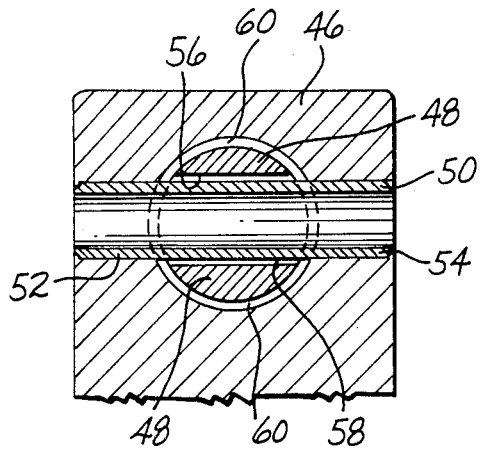
FIG. 5 is a cross-sectional view, taken along the lines 5—5 in FIG. 4.
Figure 4:
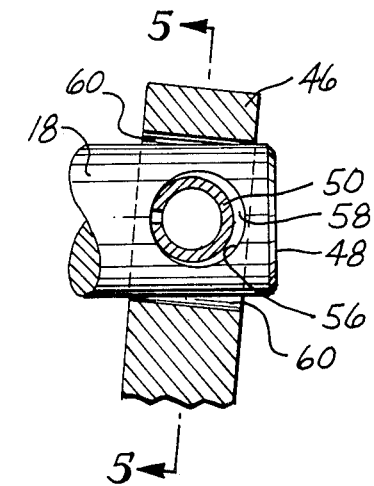
FIG. 4 is a fragmentary view, taken along the lines 4—4 in FIG. 2.

A block 76 is secured to the body 12 by screws not shown, and aligned by roll pins 78, only one shown, and extending to the left from the block 76 is a cylindrical, fixed pivot stud 80 on which a second friction clamp 82 is pivotally mounted, FIG. 3. The second clamp 82 is identical to the first clamp 46 and it is also mounted for pivotal movement in the same manner as the first clamp on a roll pin 50, having its ends 52 and 54 press fit in the clamp 82 so as to be fixed therein. There is a clearance 84 between the roll pin 50 and the pivot stud 80 in an opening in the stud through which the pin extends. This clearance permits vertical movement of the clamp with respect to the pin. There is a second clearance 86 between the pivot stud 80 and the opening 88 in the second clamp and into which the pivot stud 80 extends. The clearance 86 permits the second friction clamp 82 to pivot on the roll pin 50 with respect to the pivot stud 80. The second friction clamp 82 is biased to the left away from the direction of pumping by coil spring 90 having one end extending into an opening in the block 76 and having its other end extending into an opening in the friction clamp. At the lower end of the clamp 76 there is a cylindrical bore 92 and extending therefrom to the left is a countersunk conical opening 94.

There are two bores in the block 12 in general alignment with the openings 66 and 92 in the friction clamps, FIGS. 1, 6, and 7. In these bores there are brass bushings 98 and 100 to receive a heat hardened, highly polished piston rod 102 in a sliding bearing relationship. The rod is inserted through the bushings, and through the conical openings 68 and 94 in the clamps which serve as guides into the cylindrical bores 66 and 92, respectively, the spring 70 and 90 biasing the conical surfaces into contact with the rod 102. The rod 102 is heat treated to the high hardness to prevent nicking or denting thereof.

The points of contact of the spring 70 and 90 against the friction clamps is located between the pivot points of the clamps and the rod 102. These locations minimize free play of the clamps during motion of the shaft 18 to effect a precision action relative to a precise quantity dispensed by the pump. For example, and shown in FIG. 4, if the spring bias was located on the opposite side or above the pivot point, then the roll pin 50 would be forced to contact the opening in the shaft end on the right side of the hole and the clearance 56 would occur on the left. This would result in extra motion causing a loss of precision in the pumping. That is, when the shaft 18 is moved to the right in the pumping direction, it automatically starts to move the roll pin and the clamp 46 to the right at the same time.

A conventional adapter 106 is threadedly engaged in the block 12 at the right hand end to surround the rod 102. Extending into the adapter 106 is a tube or a cartridge 110 containing a liquid of any type. In the specific embodiment shown, the device has been made for the purpose of precisely dispensing a sealant to seal heads of rivets in aircract. The sealant, being rather viscous, is loaded into the cartridge and the cartridge is then inserted into the block 12 and secured therein by an adapter cap 114.

A piston 118 is positioned in the left end of the cartridge at the start of the operation and the piston has an O-ring 120 retained by boss 122. For the particular sealant in question, it is not necessary that the O-ring provide a positive seal. As shown in FIG. 1A, an outer end of the tube 110 is secured within an adapter 124 and from which extends a small diameter dispensing tube 126 which is sized to dispense the precise quantity of sealant as a result of each movement of the shaft 18 to the right or in the pumping direction. The tube 110 may be made of hard or soft plastic and the piston is typically a hard plastic material, both of which may be disposable when the cartridge has been emptied. The adapters 114 and 124 as well as the dispensing tube 126 may also be disposable so as to eliminate cleaning. In a rivet sealing operation, a cartridge 110 about 12 inches long with a rod 102 of a similar length will function to pump the sealant into the rivet heads through an eight hour working shift, for example. After the cylindrical tube 110 is emptied and removed, the rod 102 may be pulled out of the body 12 from left to right and cleaned and then reinstalled for the next operation.

In operation, liquid is loaded into the cylindrical tube 110 by normal shop practices and the piston 118, the adapter 114, the adapter 124 and the dispensing tube 126 are mounted as a unit onto the body 12.

The rod 102 is then inserted into the body 12 from the left side. It is pushed through the bushing 98, the clamp openings 68, 66, 94, 92 and the bushing 100 into abutment with the piston 118 which is at the left end of the cartridge 110. At this time the liquid may be manually pushed out of the dispensing tube 126. The operator continues applying pressure on the tube 102 until the system is primed. This manual priming is a significant time saving when the incremental dispensing operations are small. After priming, actual precision dispensing may begin. For low-viscosity liquids, the pump will dispense precisely when the liquids can be held in the dispensing tube by capillary attraction and pressure differential.

The air cylinder is connected to be operated in a predetermined manner to effect an incremental motion on the shaft 18 and on the rod 102, to the right, to dispense a precise quantity through the dispensing tube 126. When the shaft 18 moves to the right, it pushes friction clamp 46 to the right and the clamp, as indicated in FIG. 6, maintains its grip on the rod 102 and carries it while at the same time the friction clamp 82 releases its grip on the rod and allows the rod to slide to the right. This causes the piston to move the correct amount to dispense the desired quantity through the tube 126. The rightward movement of the piston is limited by the distance 36 between the adjusting nut 26 and the spacing surface 28.

When the shaft 18 moves to the left, it is stopped by the pin 34 as shown in FIG. 1. When the shaft 18 moves to the left, friction clamp 46 releases its grip and at the same time friction clamp 82 maintains its grips on the rod, holding it from moving to the left. Thus, the rod 102 during operation is only moved rightwardly or in the pumping direction. The ability to effect a precise movement of the rod 102 in the pumping direction to dispense a precise quantity, while at the same time having a rod which is self-aligned in the bushings and friction clamps during insertion is a primary advantage of the invention. This provides for a simplified design that reduces manufacturing cost and eases operation of the unit, making it acceptable in a efficient manufacturing shop operation.

When the operations are complete, the cylindrical tube 110 and the other parts may be removed and discarded so as to avoid the need for a cleaning operation which would be time consuming. The rod is removed from the right side and wiped off to remove any contaminants and then the pump is ready to be started again.

As shown in FIGS. 2–5, the clearances 60 and 56 permit the friction clamps to translate in directions essentially perpendicular to the rod 102. This translation is limited by the amounts of clearances so that the friction clamps are retained in near vicinity ready to receive the rod 102, but the clearance is still large enough to permit easy insertion of the rod. The radial location of the rod in the body 12 is precise. The radial alignment of the friction clamps to the rod is accomplished by permitting the friction clamps to float in radial directions relative to the rod, but not float relative to axial displacement with respect to the rod.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific form shown or uses mentioned except as defined in the accompanying claims.

What is claimed is:

1. A positive displacement pump for precisely dispensing viscous liquids or liquids which are retained in a dispensing tube at the pump discharge by capillary attraction and pressure differential, comprising:

a pump body having a shaft fitted for reciprocating therein;

means connectable to the body for reciprocating the shaft in a pumping direction and reverse;

means adjacent one end of the shaft to limit movement thereof in a pumping direction a predetermined amount, and means adjacent said one end of the shaft to limit movement thereof in a direction reverse to the pumping direction a predetermined amount;

a first friction clamp pivotally mounted adjacent one of its ends adjacent the other end of the shaft;

a second friction clamp pivotally mounted adjacent one of its ends on a member fixed to said body adjacent said other end of said shaft;

the other ends of the clamps depending from the pivotal mountings and having cylindrical openings therethrough in substantial alignment to receive a piston pump rod therethrough;

said pump rod being slidably supported in said pump body;

means connected to said body biasing said other ends of said clamps reverse to the direction of pumping;

said means to bias said clamps biasing said clamp into a gripping relationship with said rod;

said shaft when moved in the pumping direction being pivotally connected to said first clamp to move said first clamp, against its means to bias, in the pumping direction;

said first clamp when so moved maintains its grip on said rod and carries said rod in the pumping direction;

said rod when so moved, moves said second clamp against its means to bias to release the gripping relationship of the second clamp from the rod, to allow the rod to move in the pumping direction said predetermined amount;

said rod extending into one end of a tube connected to said body and containing liquid to be pumped and dispensed in a predetermined amount relative to the limited movement of said rod;

a piston in said tube positioned to be moved by said rod in a pumping direction; and a dispensing end of said tube to discharge said predetermined amount of liquid when said rod is moved said predetermined amount in the pumping direction;

said means for reciprocating said shaft being connectable to said body to reverse said shaft when said shaft is moved in said pumping direction said predetermined amount;

when said shaft is moved in the reverse, said first clamp is moved in its biased direction and releases its grip from said rod, and at the same time, the second clamp is biased by its biasing means and maintains its grip on said rod to prevent it from moving in the reverse direction, said rod being movable only in the pumping direction.

2. The invention according to claim 1 in which:

said rod is heat hardened and smoothly finished, the hardening being for the purpose of preventing nicking and denting;

said rod being precisely aligned in smooth bushings fitted in said pump body.

3. The invention according to claim 2 in which:

said rod is self-aligning, as it is inserted into said bushings and said friction clamps, with respect to said clamps to effect a precise motion when moved in the pumping direction.

4. The invention according to claim 1 including:

supporting means for pivotally mounting said clamps on said shaft and said member, clearances between said supporting means and said shaft and said member, and clearances between clamps and said shaft and member to minimize free motion and backlash in the pumping action to promote precise quantity dispensing of the liquid.

5. The invention according to claim 1 in which:

said first and second clamps are pivotally mounted on pins having their ends fixed within said clamps;

there are clearances between said pins and said respective shaft and member;

there are clearances between said clamps and said respective shaft and member;

said clearances permitting the clamps to translate in directions essentially perpendicular to the rod, the translation being limited by the amount of clearances so that the clamps are retained in position to receive the rod, but the clearances are large enough to permit easy insertion of the rod, each of the clamps having a conical counterbore to guide the rod into the cylindrical openings.

6. The invention according to claim 5 in which:

the pump may be primed by hand moving the rod and piston to apply pressure on the liquid in the tube.

7. The invention according to claim 5 in which:

the pin is positioned in the shaft so that there is no clearance between a trailing end of the pin and the shaft.

8. The invention according to claim 1 in which:

the friction clamps float in a radial direction relative to the rod so that the radial location of the rod in the pump body may be fixed and precise;

the friction clamps are biased with respect to the rod to eliminate axial floating with respect to the rod.

9. The invention according to claim 1 in which:

the piston and tube are disposable; and the rod may be cleaned as necessary and reinserted into the pump body.

10. The invention according to claim 1 in which:

the pumping volume may be varied by changing the tube diameter and/or length, and by changing the rod length.

* * * * *